United States Patent [19]

Gilovich et al.

[11] 4,300,176
[45] Nov. 10, 1981

[54] FIXED DISC HEAD ACTUATOR ASSEMBLY

[75] Inventors: Paul A. Gilovich, Saratoga; Joseph S. Tung, Morgan Hill, both of Calif.

[73] Assignee: Microcomputer Systems Corp., Sunnyvale, Calif.

[21] Appl. No.: 45,430

[22] Filed: Jun. 4, 1979

[51] Int. Cl.³ .............................................. G11B 21/02
[52] U.S. Cl. ...................................... 360/105; 360/75
[58] Field of Search ...................... 360/106, 104–105, 360/97–99, 137, 75, 78

[56] References Cited

U.S. PATENT DOCUMENTS

| | | | |
|---|---|---|---|
| 3,735,163 | 5/1973 | Dijkstra et al. | 360/106 X |
| 3,849,800 | 11/1974 | Cuzner | 360/97 |
| 4,150,407 | 4/1979 | Dijkstra | 360/106 |

FOREIGN PATENT DOCUMENTS 2209522  9/1972  Fed. Rep. of Germany ...... 360/106

OTHER PUBLICATIONS

Patent Associated Literature–IBM Journal of Research and Development, vol. 20, No. 4, pp. 389–397, Jul. 1976, "Design of a Swinging Arm Actuator". . . by Heath.
"Computer Design", Feb. 1979, Design Notes, pp. 116–120, Disc File Actuator Design . . . by Lissner et al.
IBM/TDB, vol. 17, No. 10, Mar. 1975, "Desk File Actuator" by Lissner et al., pp. 3016–3018.
IBM/TDB, vol. 19, No. 4, Sep. 1976, "Actuator Retraction Device" by Hear, p. 1440.

*Primary Examiner*—John H. Wolff
*Attorney, Agent, or Firm*—Flehr, Hohbach, Test, Albritton & Herbert

[57] ABSTRACT

An actuator assembly for magnetic heads used with fixed magnetic discs. The heads are supported from one end of arms in a support assembly which is pivoted at the other end. Drive forces are applied directly to each of the arms through the support assembly at the center of percussion between the pivot and the heads. Drive forces are generated by a drive assembly including a coil and permanent magnets.

10 Claims, 4 Drawing Figures

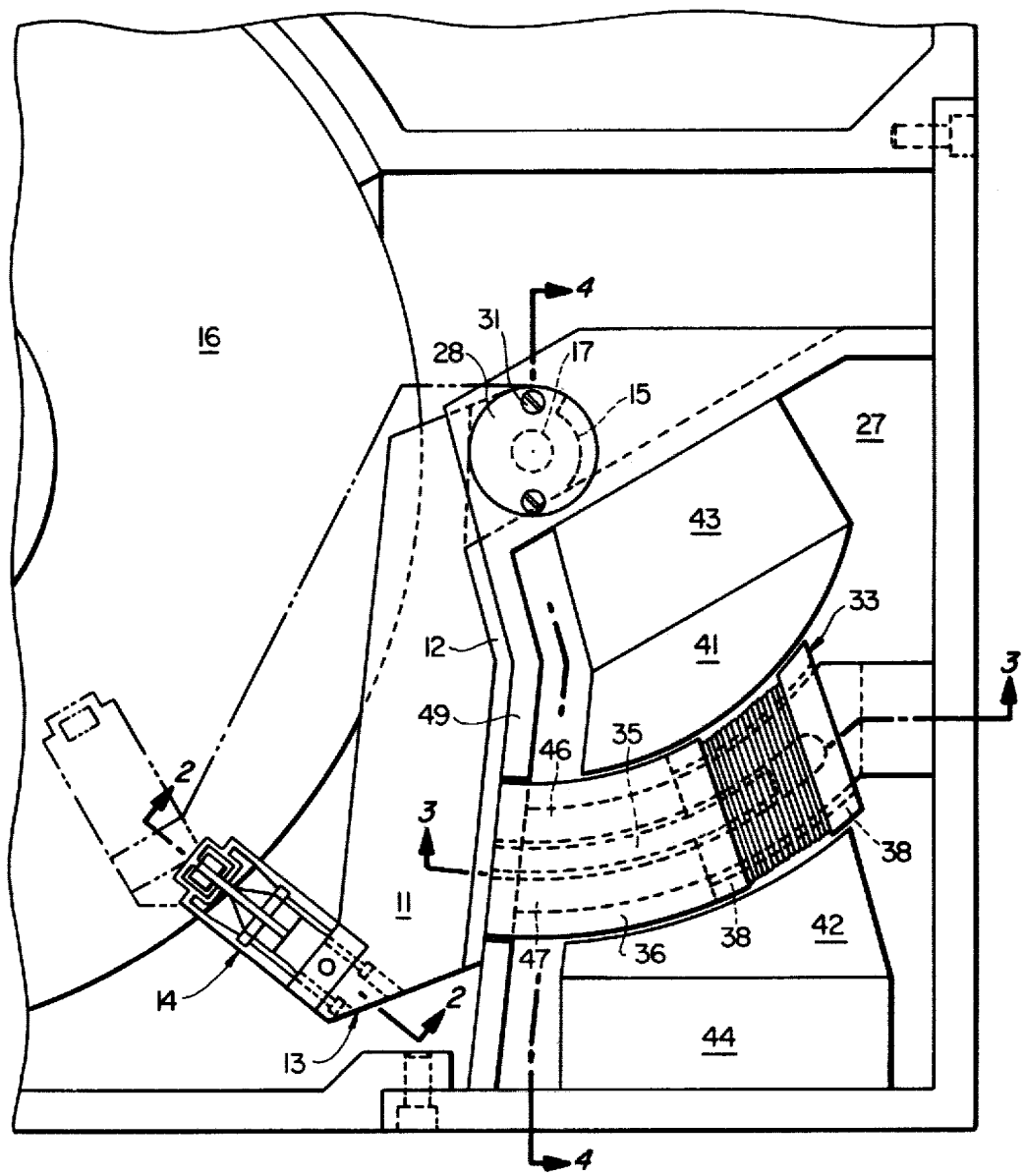
FIG_1
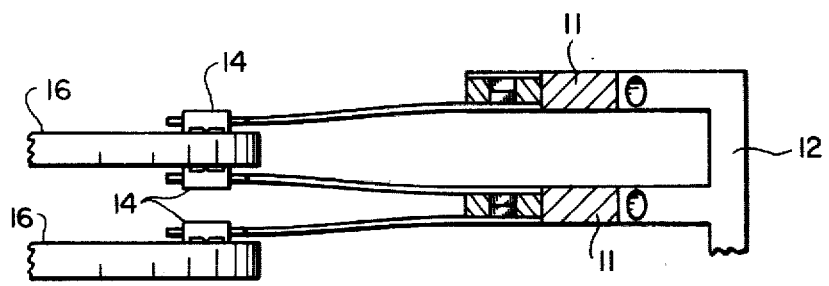
FIG_2

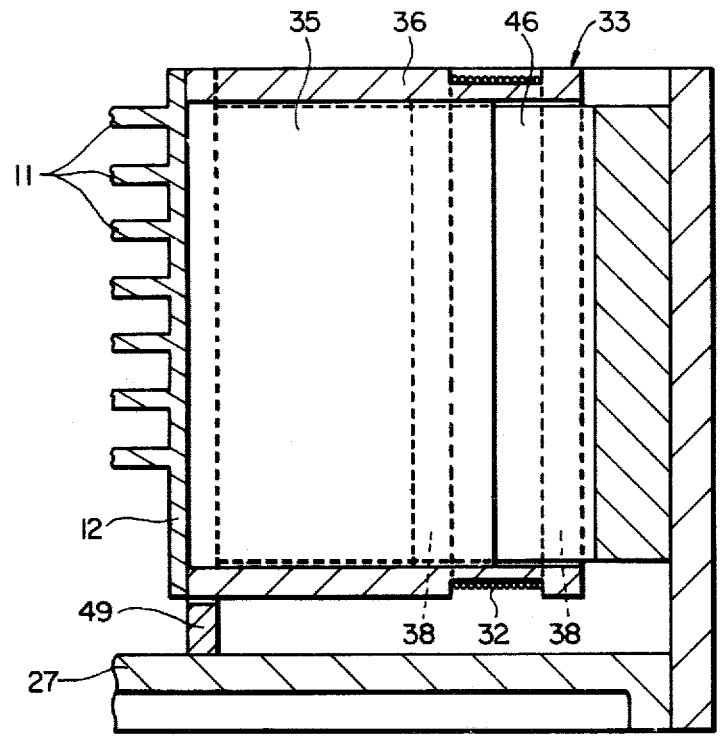
FIG_3
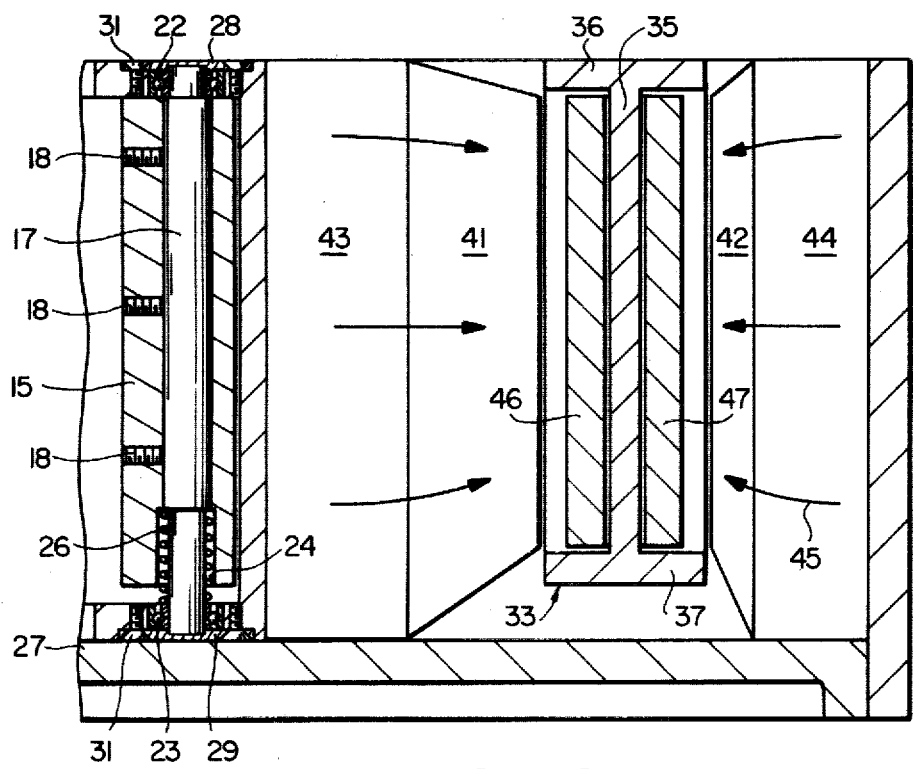
FIG_4

FIXED DISC HEAD ACTUATOR ASSEMBLY

This invention relates to an actuator motor for heads used in connection with fixed disc drives.

Actuators for magnetic heads used in connection with fixed magnetic disc drives are well known. Prior art actuators have generally comprised a plurality of spaced arms adapted to support magnetic heads which are disposed to cooperate with the surfaces of the disc. The arms extend outwardly from a pivot; a drive motor is disposed on the opposite side of said pivot and serves to rotate the arms about the pivot. When the heads are moved rapidly, large reaction forces are generated at the pivot and consequently expensive pivot bearings and assemblies are required. Inertia limits the speed at which the heads can be moved. The plurality of magnetic head arms are centrally driven and when all the heads are active, the outer heads are the last to be positioned because they are indirectly driven. In general, the prior art assemblies have also suffered from large stray leakage fields from the motor drive magnets, which fields have linked the discs and erased or deteriorated the information stored on the discs.

Recently there has been introduced a fixed head actuator assembly in which the head support arms are driven from the same side as the pivot by a coiled metal band driven by a stepper motor.

It is an object of the present invention to provide an improved head actuator assembly for disc drives.

It is another object of the present invention to provide an actuator assembly in which inertia is minimized.

It is a further object of the present invention to provide a head actuator assembly in which the actuator forces are applied to the arm on the same side of the pivot as the magnetic heads to reduce bearing forces and minimize inertia.

It is another object of the present invention to provide a moving coil permanent magnet motor which is highly efficient and which has minimum stray magnetic fields.

It is another object of the invention to provide a drive in which all head supports are engaged by the drive member to limit flexure of the arms and drive them in unison.

The foregoing and other objects of the invention are achieved by a magnetic head actuator assembly for fixed discs which include a pivot means, a head support including a plurality of arms adapted to support magnetic transducers on one side of the pivot for cooperation with the discs and pivoted at said pivot means, a coil support and arm actuator means extending from said head support and engaging said arms on the same side of said pivot, a coil wound thereon, and means including at least one permanent magnet providing a gap in which the coil may move to cause the actuator to actuate said arms and the head support to rotate about said pivot and move said heads into cooperative relationship with said discs. The magnetic head assembly includes a closed magnetic path to minimize stray fields.

FIG. 1 is a plan view of a portion of a disc drive such as that described in copending application Ser. No. 45,215, filed June 4, 1979 filed simultaneously herewith, showing a plan view of the fixed disc magnetic head actuator assembly and heads.

FIG. 2 is a sectional view taken generally along the lines 2—2 of FIG. 1.

FIG. 3 is a sectional view taken along the lines 3—3 of FIG. 1.

FIG. 4 is a sectional view taken along the lines 4—4 of FIG. 1.

The head actuator includes a plurality of head arms or supports 11 formed integral with a plate 12 to extend outwardly therefrom. The ends 13 of the arms are adapted to support magnetic head assemblies shown generally at 14 which may be any conventional magnetic head assembly. The other ends of the arms are formed integral with a collar 15. As the arms are moved from the position shown in solid line to the position shown in dotted line, the heads are moved inwardly and outwardly radially along the disc 16 to read or write information on the associated disc 16. Heads 14 cooperate with each surface of the disc as shown generally in FIG. 2.

The actuator collar is secured to a pivot shaft 17 by set screws 18, FIG. 4. The shaft has its ends mounted in the inner races of bearings 22 and 23 and is recessed 24 at one end to receive a spring 26 which urges the shaft upwardly into seated engagement with the inner race of the upper bearing 22. The spacing of the arms is maintained with respect to the base plate 27 by the force of the spring. The bearing and shaft assembly is secured by means of top and bottom plates 28 and 29 and associated securing means such as screws 31. Thus, the actuator including the arms is pivoted at the pivot shaft 17 to move the heads inwardly and outwardly radially along the disc surfaces.

In accordance with the present invention, the actuator assembly is driven by a coil 32 wound upon a bobbin 33 defined by top and bottom plates 36 and 37, FIGS. 1 and 4, and web member 35, together with side walls 38 shown in dotted line in FIG. 1. The web member 35 engages the plate 12 and is opposite each of the head arms to provide direct force to each arm and minimize flexure of the head arms support. Preferably, the web is located at the center of percussion on the head support to minimize forces on the pivot assembly and provide rapid response.

The coil is formed to fit within a gap formed between the pole pieces 41 and 42 associated with permanent magnets 43 and 44, respectively. The other pole pieces for the gap are the pole pieces 46 and 47 which are connected by low reluctance magnetic paths 48 and 49 to the magnets 43 and 44. The magnetic field path is shown generally by the arrows 45. The only gap from which leakage fields can extend towards the recording disc is the gap in the low reluctance members 49 through which the web member travels.

By applying currents to the coil, the magnetic fields generate a force which moves the coil support outwardly or inwardly depending on the polarity of the current. In accordance with well established operation, the motor is connected in an electrical servo loop and acts as a servo motor which can accurately position the heads responsive to control signals.

Control signals are derived for controlling the positioning of the heads on particular tracks. In this respect, it is well known that one of the discs of the associated disc assembly may include a plurality of reference tracks which are read by a magnetic head providing an output signal supplied to the servo control circuit which then operates to energize the coil so as to stop the coil and movement of the heads on a particular track to read and write therefrom.

Thus it is seen that there has been provided a head actuator motor which is simple in construction, minimizes stray fields, applies forces to the head support on the same side as the pivot to minimize pivot wear and to provide increased speed of response.

What is claimed is:

1. A head actuator assembly for fixed disc memories comprising
    a pivot assembly,
    an elongated head support including a plurality of arms adapted to support heads having one end pivotally mounted on said pivot assembly and extending from said pivot assembly with the other end adapted to cooperate with the fixed discs,
    coil support means extending outwardly from one side of said elongated support between the said ends, of said elongated head support
    a coil wound on said coil support means, and
    means including at least one permanent magnet providing a magnetic field in which said coil may move in a direction to cause said coil support means to move and rotate said elongated head support about said pivot assembly whereby when said coil is energized it provides a motive force to the one side of the elongated head support to drive the arms and position the associated heads with respect to the disc.

2. A head actuator as in claim 1 in which said coil support extends outwardly opposite each of said arms whereby the motive force is applied to the side of each of said arms.

3. A head actuator as in claim 1 wherein said head support is engaged by the coil support at the center of percussion.

4. A head actuator as in claim 1 in which said means providing a magnetic field includes a pair of spaced permanent magnets, magnetic means associated with the same pole of each of said magnets forming a first magnetic pole face for each of said magnets, second magnetic means associated with the other pole of each of said magnets forming a second magnetic pole face for each of said magnets spaced from the first magnetic pole face of each of said magnets to form a pair of spaced gaps, said coil being supported to move in said gap and surround the second magnetic means.

5. A head actuator as in claim 4 in which said second magnetic means includes means forming a low reluctance path between the other pole of each of said magnets and the second pole face to provide a closed magnetic path to minimize leakage magnetic fields.

6. An actuator for moving magnetic heads associated with disc memories comprising
    a support assembly for magnetic heads including a plurality of elongated spaced arms for supporting magnetic heads at one end for cooperation with associated disc memories,
    a pivot assembly supporting the other end of said arms to permit said arms to rotate and position the heads with respect to the surface of an associated disc memory,
    a coil support including a web member extending outwardly from one side between the one and the other end adjacent each of said arms,
    a coil wound upon said support; and
    means including a pair of permanent magnets and pole pieces defining a pair of spaced magnetic gaps with magnetic fields extending across said gaps, said means being positioned to receive said coil in said gaps whereby when current is applied to said coil it is moved in said gap and forces said web to drive said arms and heads.

7. An actuator as in claim 6 in which said web engages said arms support at the center of percussion.

8. An actuator as in claim 6 including low reluctance closed magnetic material providing a magnetic path between said pole pieces and reducing stray magnetic flux.

9. A head actuator assembly for fixed disc memories comprising
    a pivot assembly,
    a plurality of spaced elongated flat head support arms adapted to support heads at one end therefor for cooperation with said disc memories,
    a collar at the other end of said arms,
    pivot means adapted to receive said collar and pivotally supporting said arms for cooperation with said disc memories,
    a coil support extending outwardly from one edge of said head support arms between said one end and the other end of said arms,
    a coil wound on said support,
    a pair of permanent magnets spaced from one another with poles of the one polarity facing one another and pole pieces associated with each pole of each of said magnets to form a gap for receiving said coil the pole pieces associated with the permanent magnet poles of the other polarity including a low reluctance magnetic material defining a closed path from the permanent magnet to the gap.

10. A head actuator as in claim 9 in which said coil support is positioned along said arms at the center of percussion.

* * * * *